United States Patent [19]
Fetty

[11] Patent Number: 4,515,191
[45] Date of Patent: May 7, 1985

[54] RADIAL UNIVERSAL TOOL

[76] Inventor: James R. Fetty, Chatham, La. 71226

[21] Appl. No.: 525,110

[22] Filed: Aug. 22, 1983

[51] Int. Cl.³ .............................................. B27C 9/00
[52] U.S. Cl. .................... 144/1 C; 29/560; 82/32; 409/240; 144/35 R
[58] Field of Search ............. 29/560; 409/240; 82/32, 82/6 R; 144/1 R, 1 C, 1 G, 35 R, 286 R, 46

[56] References Cited

U.S. PATENT DOCUMENTS

| | | | |
|---|---|---|---|
| 2,619,135 | 11/1952 | Callaway | 144/1 C |
| 2,800,154 | 7/1957 | Ellis | 144/1 C |
| 3,299,918 | 1/1967 | Howey | 144/1 C |
| 3,410,326 | 11/1968 | Paquin | 144/1 C |
| 3,988,814 | 11/1976 | Hoffman | 144/1 C |
| 4,140,032 | 2/1979 | Besenbruch et al. | 29/560 |

FOREIGN PATENT DOCUMENTS 2080159  2/1982  United Kingdom ................. 29/560

*Primary Examiner*—W. D. Bray
*Attorney, Agent, or Firm*—John M. Harrison

[57] ABSTRACT

A radial universal tool which is designed to perform the functions of a tablesaw, wood lathe, metal lathe, drill press, horizontal boring machine, milling machine and disc sander, which includes a light-weight frame having a pivoting end member and a non-pivoting end member at opposite ends, a top, middle and bottom way system in cooperation with a radial head stock, a radial tail stock, a tilt table and a cross slide vise. In a preferred embodiment the universal tool frame is fitted with wheels at one end to facilitate ease of mobility.

20 Claims, 21 Drawing Figures

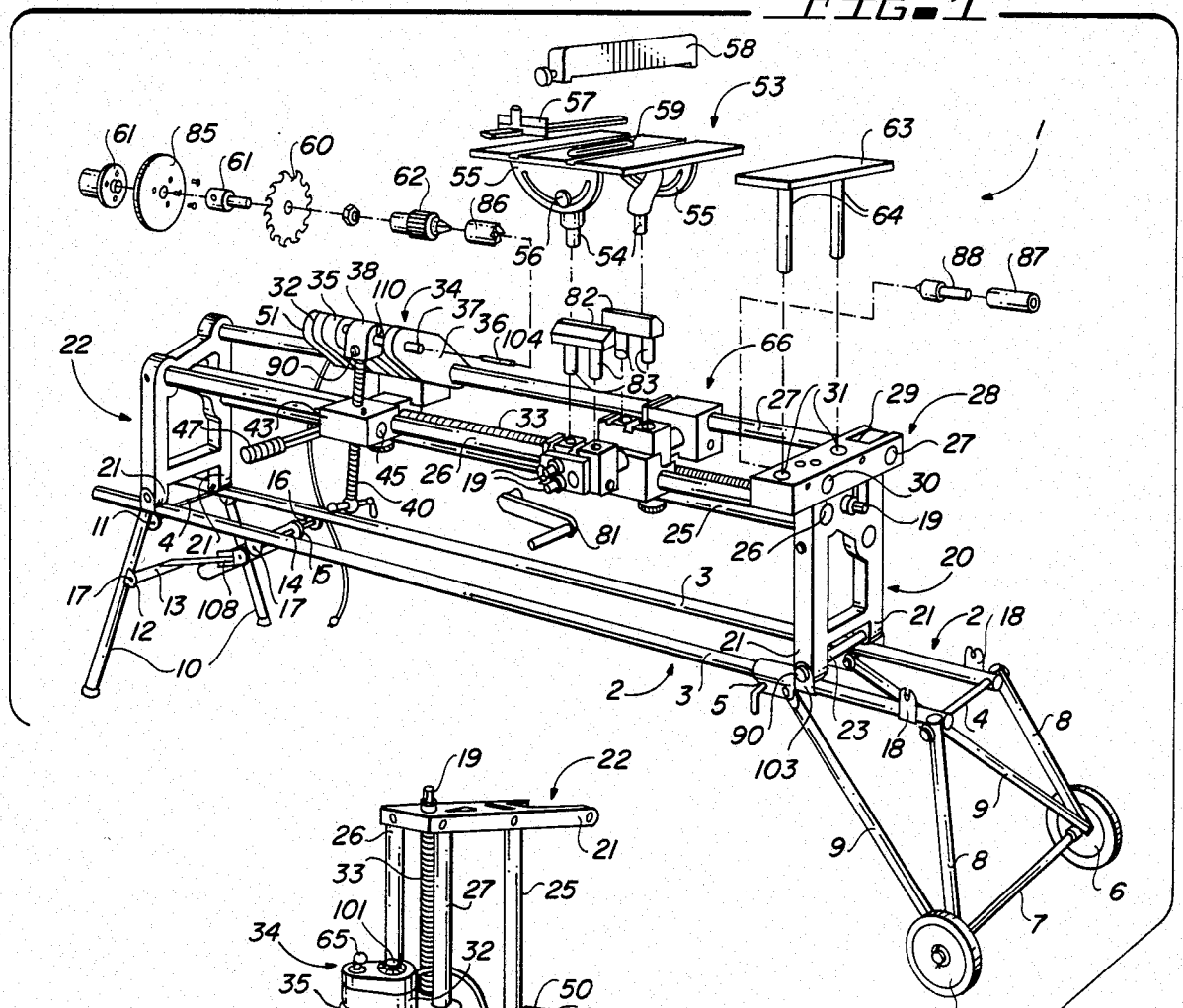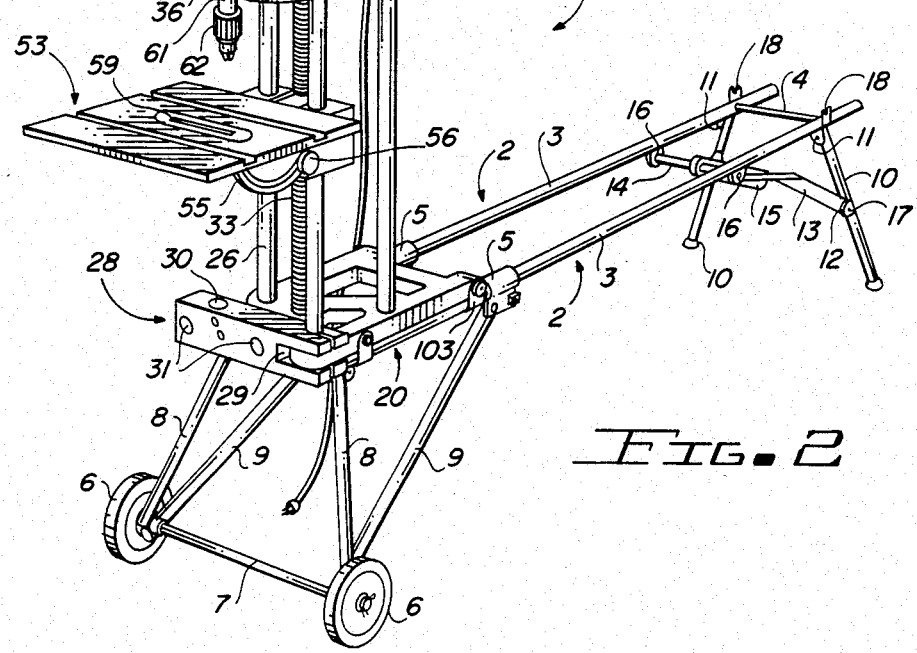

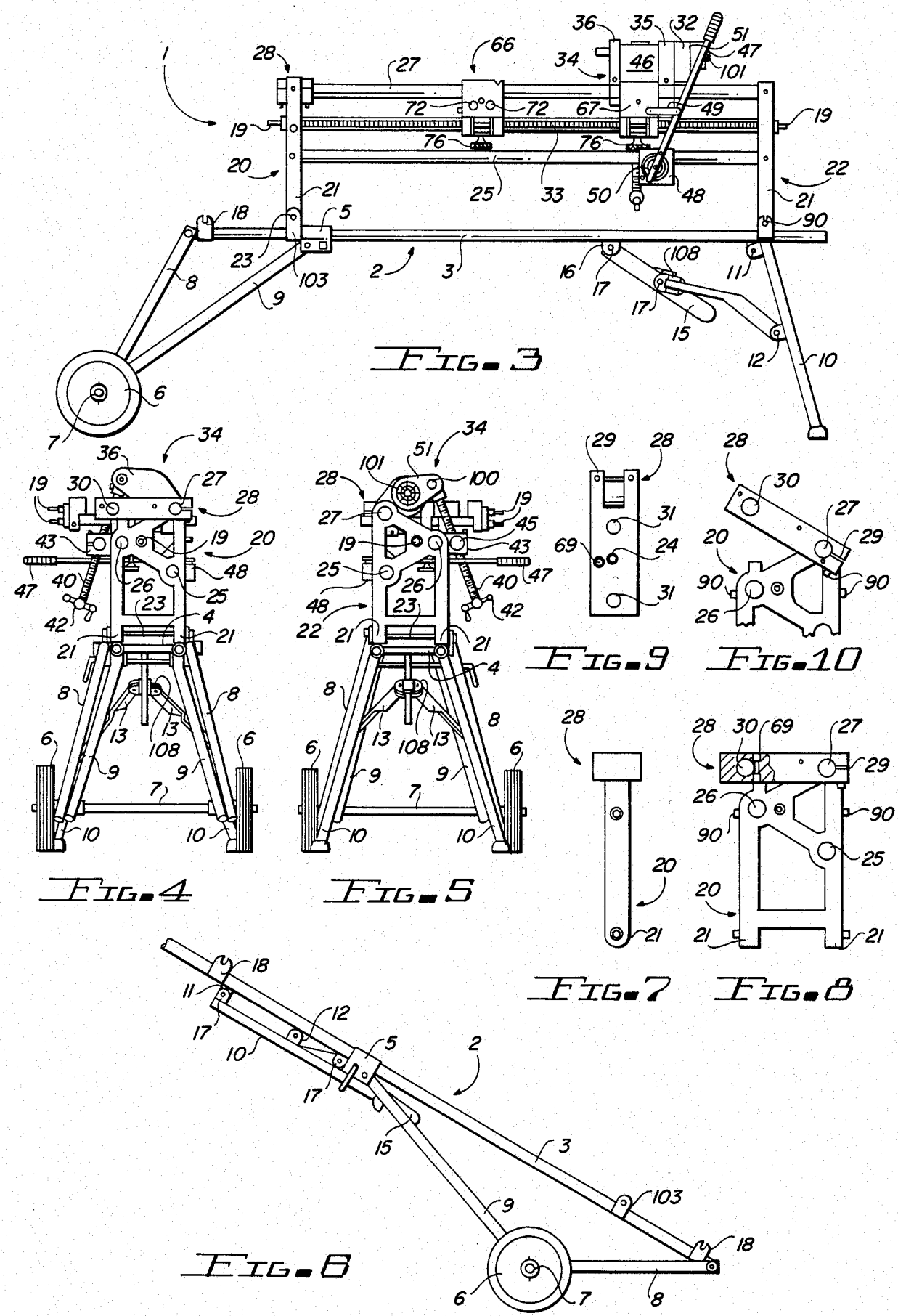

RADIAL UNIVERSAL TOOL

BACKGROUND OF THE INVENTION

Field of the Invention

This invention relates to wood and metal working tools and more particularly, to a radial universal tool which is designed to perform the functions of a tablesaw, wood and metal lathe, drill press, horizontal boring machine, milling machine and disc sander. The radial universal tool of this invention is characterized by a light-weight frame which carries a pivoting end member on one end and a non-pivoting end member on the opposite end and having a top, middle and bottom way system disposed between the pivoting and non-pivoting end members and carrying a radial head stock, a radial tail stock, a tilt table and a cross slide vise, all variations of which can be utilized in various configurations of the tool to selectively perform the functions noted above. In a preferred embodiment of the invention the frame is provided with wheels to enhance portability of the tool. The top, middle and bottom way system, in cooperation with the non-pivoting end member, is pivotable on the pivoting end member to place the top, middle and bottom way system in essentially vertical orientation. This configuration facilitates function of the radial universal tool as a tablesaw and a drill press. Other functions of the radial universal tool are possible in both the vertical and horizontal disposition.

In recent times the acquisition of a workshop which is fitted and provided with such tools as a tablesaw, wood lathe metal lathe, drill press, horizontal boring machine, milling machine and disc sander can be prohibitively expensive. With the increasing tendency toward smaller homes and less space in which to deploy and use equipment, a need for a universal tool or tools is widely recognized. Such tools are known in the prior art but generally speaking, are limited to from two to four tools in combination and many of them are heavy, bulky and difficult to move. Furthermore, the various functions are somewhat cumbersome in many of these tools and the time required to set up for a specific function is sometimes prohibitively long. Accordingly, it is an object of this invention to provide a new and improved universal tool which incorporates the function of a table saw, wood lathe, metal lathe, drill press, horizontal boring machine, milling machine and disc sander in a portable frame which is compact, sturdy and easy to operate.

Another object of this invention is to provide a new and improved portable power tool of a universal nature which is characterized by portable, wheeled frame having a three "way" system mounted thereon and a radial head stock, radial tail stock, tilt table and cross slide vise mounted on the three "way" system to perform the functions of a tablesaw, wood and metal lathe, drill press, horizontal boring machine, milling machine and disc sander.

Yet another object of this invention is to provide a new and improved radial universal tool which is capable of performing as a tablesaw, wood and metal lathe, drill press, horizontal boring machine, milling machine and disc sander, which tool is characterized by a wheeled frame having a pivotally mounted, top way, bottom way and middle way system and fitted with a nonpivoting and a pivoting end member, respectively, and a radial head stock, radial tail stock, cross slide vise and tilt table slidably mounted on the three "way" system in order to perform specified functions.

Yet another object of this invention is to provide a radial universal tool which is portable, compact and easy to operate and which selectively performs the function of a tablesaw, wood and metal lathe, drill press, horizontal boring machine, milling machine and disc sander, which radial universal tool is capable of being operated in the horizontal and vertical position, depending upon which function is chosen.

SUMMARY OF THE INVENTION

These and other objects of the invention are provided in a new and improved radial universal tool which is characterized by a frame, a top way, middle way, and bottom way system pivotally secured to the frame in different planes by means of pivoting and non-pivoting end members in spaced relationship, and a radial head stock, radial tail stock, tilt table and cross slide vise slidably mounted on the top way, bottom way, and middle way in order to selectively perform the functions of a tablesaw, wood and metal lathe, drill press, horizontal boring machine, milling machine, and disc sander, while the bottom way, middle way and top way system are selectively positioned in the horizontal or the vertical configuration.

BRIEF DESCRIPTION OF THE DRAWING

The invention will be better understood by reference to the accompanying drawing wherein:

FIG. 1 is a perspective, partially exploded view of a preferred embodiment of the radial universal tool of this invention;

FIG. 2 is a perspective view of the radial universal tool illustrated, in FIG. 1 in vertically oriented configuration;

FIG. 3 is a right side view of the radial universal tool illustrated in FIG. 1;

FIG. 4 is a front end view of the radial universal tool illustrated in FIG. 1;

FIG. 5 is rear end view of the radial universal tool illustrated in FIG. 1;

FIG. 6 is a left side view of the frame of the radial universal tool;

FIG. 7 is a side elevation of the pivoting end frame in the radial universal tool;

FIG. 8 is a front elevation of the pivoting end frame illustrated in FIG. 7;

FIG. 9 is a top view of the radial tail stock of the radial universal tool;

FIG. 10 is a front view, partially in section, of the radial tail stock pivotally mounted on the pivoting end frame;

DESCRIPTION OF THE PREFERRED EMBODIMENTS

Figure 11:
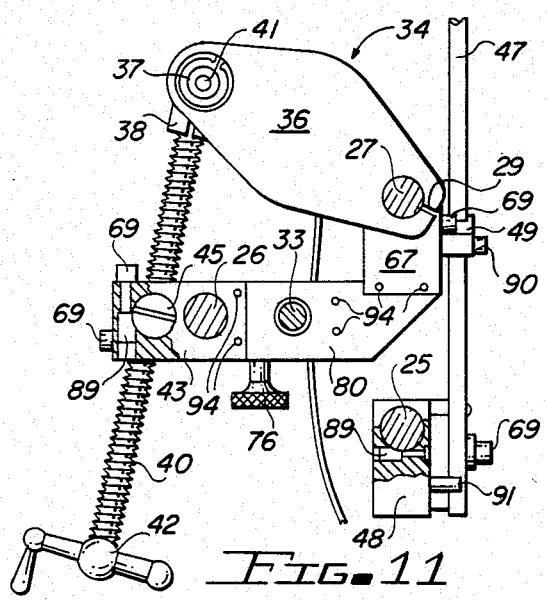
FIG. 11 is a front view of a preferred radial head stock of the radial universal tool with the traverse handle in the vertical position.
Figure 13:
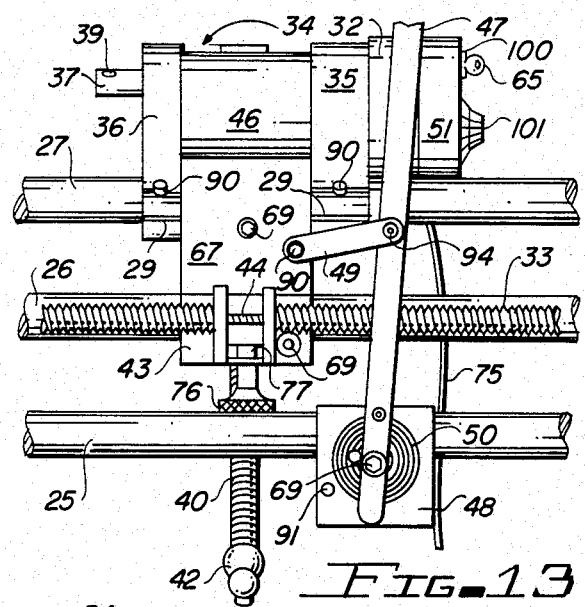
FIG. 13 is a right side view of the radial head stock illustrated in FIGS. 11 and 12 with the traverse handle in the vertical position.
Figure 12:
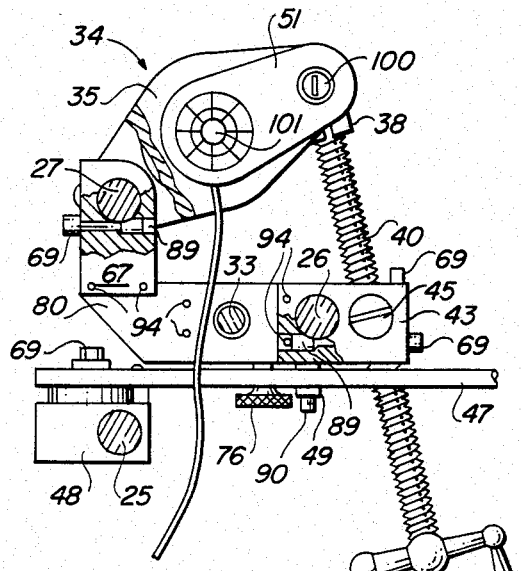
FIG. 12 is a rear view of the radial head stock illustrated in FIG. 11 with the traverse handle rotated to a horizontal position.
Figure 14:
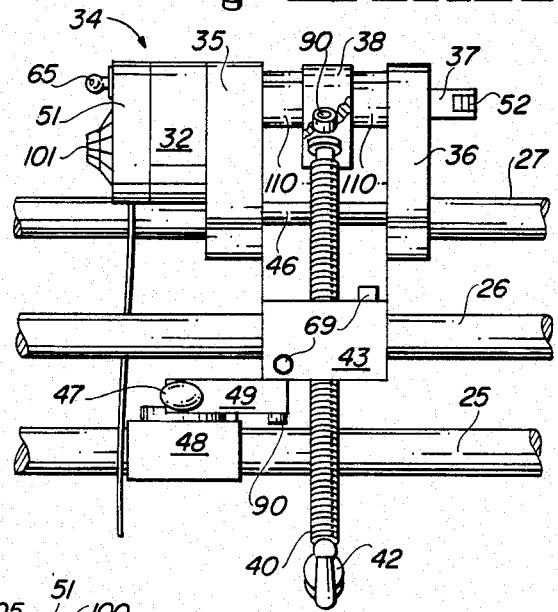
FIG. 14 is a left side view of the radial head stock illustrated in FIGS. 11, 12 and 13.

Referring now to FIG. 1 of the drawing the radial universal tool of this invention is generally illustrated by reference numeral 1 and concludes a frame 2, having a pair of parallel frame supports 3 joined by cross supports 4 at each end thereof. A slide joint 5 is attached to each of the frame supports 3 and pivotally carries a downwardly and angularly extending slide strut 9, which joins an axle 7, having a pair of wheels 6. The axle 7 is further supported by a pair of downwardly extending vertical struts 8 which are each attached at the opposite ends to the forward one of cross supports 4. A pair of end frame seats 18 extend upwardly from the frame supports 3 above the wheel 6 for a purpose which is hereinafter described. A pair of downwardly extending legs 10 are attached to the opposite end of frame supports 3 and in a most preferred embodiment, the frame supports 3 extend beyond the point of attachment to legs 10, in order to provide a means for grasping the ends of frame supports 3 opposite the wheels 6 and moving the radial universal tool 1 in the nature of a wheel barrow, as hereinafter described. A top pivot bracket 11 is secured to each of the frame supports 3 at a point adjacent the legs 10 and a bottom pivot bracket 12 is similarly secured to each of the legs 10 intermediate the ends of the legs 10, as illustrated. A pivot pin 17 secures one end of the shaped pivot links 13 to each of the bottom pivot brackets 12 and the opposite ends of the pivot links 13 are pivotally attached to a lever 15, carried by a lever shaft 14, mounted to frame pivot brackets 16 spaced from the top pivot brackets 11 on frame supports 3. The pivot link 13 and lever 15 combination facilitates pivoting of the legs 10 upwardly against the frame supports 3 when the radial universal tool is moved, as hereinafter described, in order to provide a means for moving the radial universal tool 1 from place to place as desired.

A pivoting end frame 20 is secured to the front portion of the frame supports 3 by means of end frame legs 21 and a cooperating pivot shaft 23, which is pivotally mounted in the pivot brackets 103. Similarly, a non-pivoting end frame 22 rests on a pair of end frame seats 18, provided on the opposite end of the frame supports 3 from the wheels 6. A radial tail stock 28 is positioned in pivotal cooperation with the pivoting end frame 20 and is attached by means of a bifurcated slot 29 to the top way 27, extending from the radial tail stock 28 to fixed attachment in the non-pivoting end frame 22. A middle way 26 extends with one end anchored in the pivoting end frame 20 and the other end in non-pivoting end frame 22 and a bottom way 25 extends in parallel relationship with respect to the top way 27 and the middle way 26 between the pivoting end frame 20 and the non-pivoting end frame 22. In a preferred embodiment of the invention the bottom way 25, middle way 26 and top way 27 are each characterized by substantially smooth, round bars. A feed screw 33 also extends between the pivoting end frame 20 and the non-pivoting end frame 22 and screw drives 19 project from the pivoting end frame 20 and the non-pivoting end frame 22 and are in attachment to the feed screw 33, in order to rotate the feed screw 33 for purposes hereinafter described. A tail stock lock down 24 is also provided in cooperation with the radial tail stock 28 in order to secure the radial tail stock 28 in position against the pivoting end frame 20, as illustrated in FIG. 1.

In a most preferred embodiment of the invention, due to the mounting of pivoting end frame 20 in pivotal relationship on the pivot brackets 103, the pivoting end frame 20, non-pivoting end frame 22, bottom way 25, middle way 26 and top way 27 and the radial tail stock 28 can be pivoted on the pivot shaft 23 to the configuration illustrated in FIG. 2 of the drawings. When the radial universal tool 1 is in the position illustrated in FIG. 2, the bottom way 25, middle way 26 and top way 27 are in essentially vertical orientation, along with the feed screw 33 and various functions of the radial universal tool 1 can be implemented, as hereinafter described.

Referring now to FIGS. 1-3 of the drawings in another most preferred embodiment of the invention a radial head stock 34 is slidably mounted on the top way 27 in the radial universal tool 1 and is adapted to traverse the entire length of the top way 27, responsive to manipulation of the screw drives 19 and operation of the feed screw 33. A radial screw mount 43 is similarly provided in slidable relationship on the middle way 26 and cooperates with a head screw clamp 38, carried by the radial head stock 34 by means of spacers 110. The radial screw 40, cooperating with the radial screw mount 43 and the head screw clamp 38, can therefore be operated to raise or lower the radial head stock 34 to a desired attitude. In yet another most preferred embodiment of the invention a cross slide vise 66 is provided in slidable engagement with the middle way 26 and the top way 27, as illustrated in FIGS. 1 and 3. As in the case of the radial head stock 34, the cross slide vise 66 is positioned in engagement by means of a half nut 77, more particularly illustrated in FIG. 21, with the feed screw 33 in order to facilitate movement of the cross slide vise 66 from side to side on the middle way 26 and top way 27. As illustrated in FIG. 2 in yet another preferred embodiment of the invention, a tilt table 53 is mounted on the cross slide vise 66. It will be appreciated by those skilled in the art that the tilt table 53 is designed to be easily removed from the cross slide vise 66, depending upon the particular project being undertaken with the radial universal tool 1.

Referring now to FIGS. 7-10 of the drawings the radial tail stock 28 is detailed along with the pivoting end frame 20. As particularly illustrated in FIGS. 8 and 10, the tail stock 28 is pivotally mounted on the top way 27 which extends through a top segment of the pivoting end frame 20 and in a preferred embodiment, the radial tail stock is pivoted on the top way 27 by means of the bifurcated slot 29 and the cooperating socket head screws 90. A center mount 30 is provided on the opposite ends of the radial tail stock 28 from the top way 27 in order to receive tooling such as cup center 88 and a chuck 62, used in conjunction with the wood or metal lath and illustrated in FIG. 1. Socket head screws 90 also serve to secure the pivoting end frame 20 in the end frame seats 18, to secure the pivoting end frame 20 in a vertical position.

As illustrated in FIG. 6 of the drawings in another most preferred embodiment of the invention the frame 2 of the radial universal tool 1 is capable of being folded into a readily movable configuration as illustrated. Thus, the legs 10 can be folded on the top pivot bracket 11 against the frame 2. Furthermore, the slide joint 5 is moved rearwardly of the frame 2, a procedure which shortens the distance between the wheels 6 and the frame 2, and positions the axle 7 more in line with the center of gravity of the radial universal tool 1 in order to better facilitate relocation of the radial universal tool 1 by grasping the ends of the frame 2 opposite the wheel 6 and moving the radial universal tool 1 in the manner of a wheelbarrow. It will be appreciated that the frame 2 and other frame components of the radial universal tool 1 are illustrated in FIG. 6 for clarity and that the rest of the radial universal tool 1 can be mounted on the frame 2 as heretofore described and moved as desired.

Figure 15:
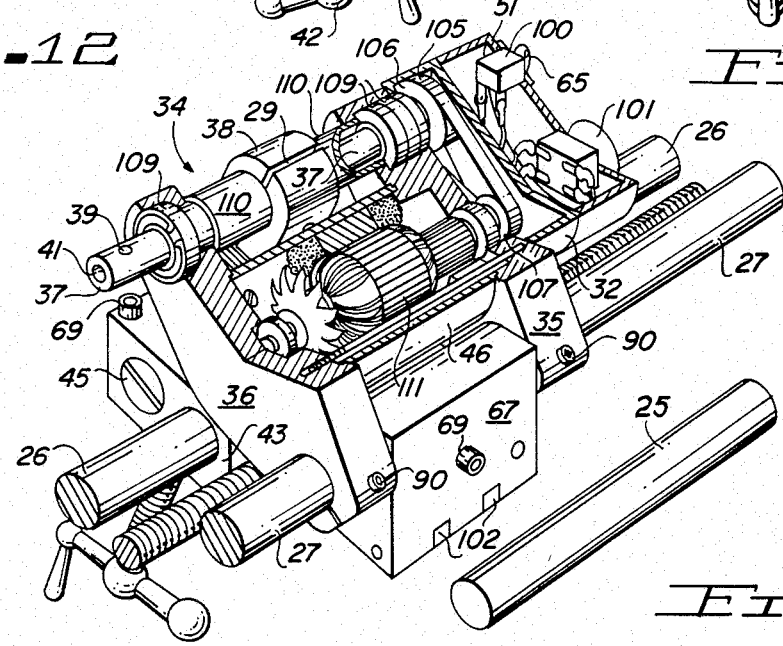
FIG. 15 is perspective view, partially in section, of the radial head stock.

Referring now to FIGS. 11–15, the radial head stock 34 of the radial universal tool 1 is illustrated and includes a pulley end motor mount 35 and a cooperating spindle end motor mount 36, spaced from the pulley end motor mount 35 and slidably secured to the top way 27. The pulley end motor mount 35 and spindle end motor mount 36 carry a spindle 37 in rotatably relationship by means of bearings 109 and the spindle 37, which projects from the spindle end motor mount 36, is provided with an end mill holder 41. A set screw 39 and spindle flat 52 are provided in the spindle 37 for a purpose hereinafter described. The head screw clamp 38, having a split housing slot 29, is secured to the spacer 110 enclosing the middle segment of spindle 37 and is positioned and maintained in substantially the center of the spindle 37 at a point substantially equidistant between the pulley end motor mount 35 and the spindle end motor mount 36 by means of the hollow spacer 110. The radial screw mount 43, slidably secured to the middle way 26, is positioned immediately beneath the pulley end motor mount 35 and spindle end motor mount 36 to threadibly receive the radial screw 40, which cooperates at one end with the head screw clamp 38. The radial screw 40 is also threadibly inserted in a split nut 45, which is in turn rotatably mounted in the radial screw mount 43. The opposite end of the radial screw 40 is provided with a radial screw handle 42, for rotatably manipulating the radial screw 40 in order to raise and lower the radial head stock 34 in a pivoting action about the top way 27. The radial screw mount 43 is secured to a slide connector 80, which is mounted on a top way slide 67, which in turn cooperates with the top way 27 and fits between the pulley end motor mount 35 and the spindle end motor mount 36 of the radial head stock 34. A pulley housing 32 fits adjacent the pulley end motor mount 35 and the adjacent electrical housing 51 serves to protect the switch 100 and certain components of the variable speed switch 101. Pulley housing 32 contains a timing belt 105, which engages a 28 tooth pulley 106 and a 14 tooth pulley 107. A half nut engaging knob 76 is threadably attached to the half nut 77 which is carried in the slide connector 80 for the purpose of engaging and disengaging the feed screw 33, in order to facilitate rapid adjustment of the radial head stock 34 or separate feedability of the radial head stock 34 or cross slide vise 66 across the feed screw 33. A traverse handle 47 facilitates the drilling application in either in a horizontal or vertical position, and cooperates with the top way slide 67 by means of a handle link 49, which is pivotally attached to the traverse handle 47 by means of a roll pin 94 and to the top way slide 67 by means of a socket head screw 90. One end of the traverse handle 47 is free, while the opposite end is rotatably secured to a handle block 48 by means of a wedge lock 69, in cooperation with a handle block spring 50. A stop pin 91, secured to the handle block 48, prevents the traverse handle 47 from rotating upwardly past a predetermined point. In a preferred embodiment of the invention the handle block 48 is slidably mounted on the bottom way 25 and can be moved in tandem with the radial head stock 34. The traverse handle assembly can be used in two different positions, one of which is illustrated in FIGS. 1, 4, 5, 12 and 14 in which the radial universal tool 1 is used in the horizontal position, and the other position illustrated in FIGS. 2, 3, 11, and 13, which is best for vertical use of the radial universal tool 1. A change in position is accomplished by removing the socket head screw 90 which attaches the handle link 49 to the top way slide 67 and loosening the wedge lock 69, of the handle block 48, sliding the handle block 48 toward the non-pivoting end frame 22, pivoting the traverse handle 47 against the handle block spring 50 underneath the radial screw mount 43 and reattaching the handle link 49 to the radial screw mount 43 by means of the socket head screw 90, and a cooperating tapped receiving aperture (not illustrated) in the radial screw mount 43. A rotor 111 is journalled for rotation in the pulley end motor mount 35 and the spindle end motor mount 36, as illustrated in FIG. 15 and a variable speed switch 101 serves to control the speed of rotation of the electric motor 46. A switch 100, activated by an on/off key 65, serves to safely deactivate the radial universal tool 1, to prevent use by unauthorized persons and to control activation of the electric motor 46, which receives power through electric cord 75. A slide connector 80 is attached to the top way slide 67 and the radial screw mount 43, by means of tongue and groove joints 102 and roll pins 94 and incorporates a half nut 77, which engages the feed screw 33 to facilitate lateral movement of the radial head stock 34.

Figures 16, 17, 18:
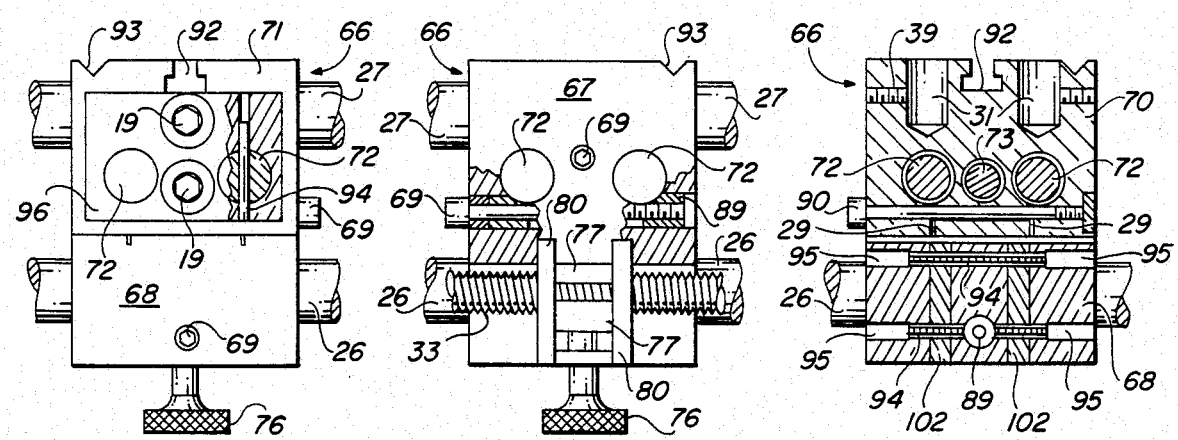
FIG. 16 is a front view, partially in section, of a cross slide vise in the radial universal tool.
FIG. 17 is rear view of the cross slide vise illustrated in FIG. 16.
FIG. 18 is a sectional view, taken along lines 18—18 in FIG. 20 of the cross slide vise illustrated in FIGS. 16 and 17.
Figure 19:
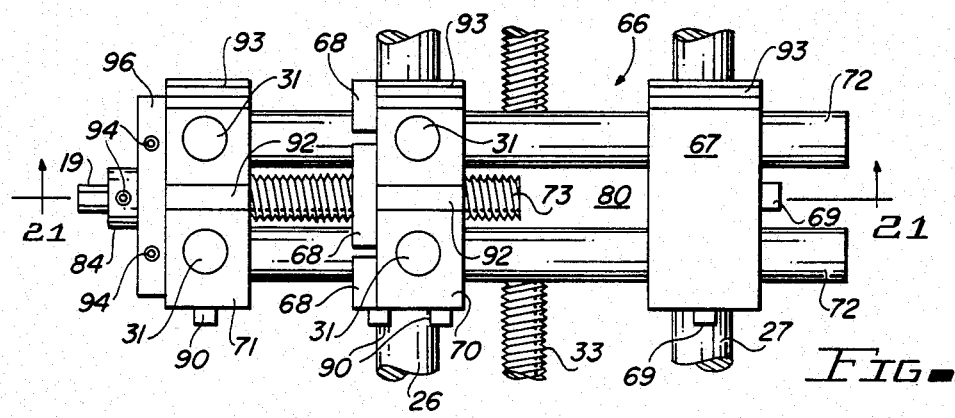
FIG. 19 is a top view of the cross slide vise in partially open configuration.
Figure 20:
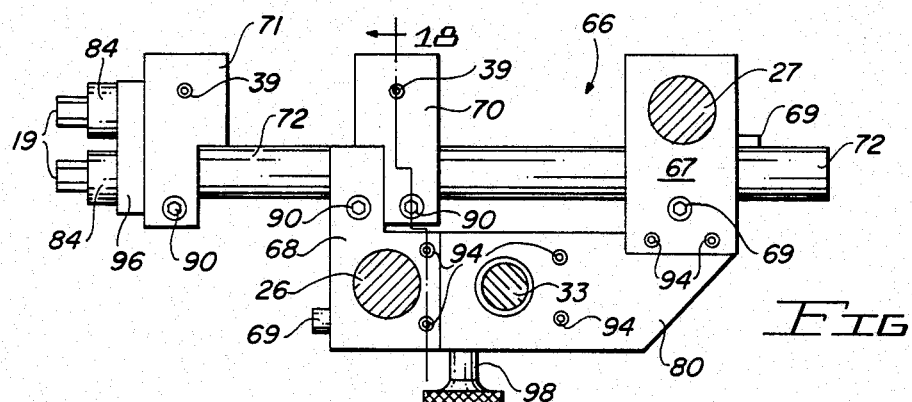
FIG. 20 is a side elevation of the cross slide vise illustrated in FIG. 19.
Figure 21:
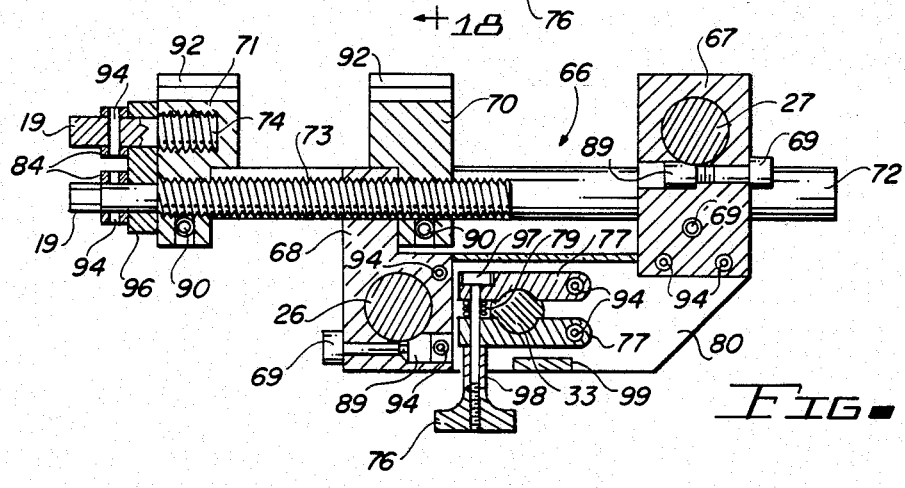
FIG. 21 is a sectional view, taken along lines 21—21, in FIG. 19, of the cross slide vise.

Referring now to FIGS. 1 and 16–21, in another preferred embodiment of the invention a cross slide vise 66 is provided in cooperation with the middle way 26 and the top way 27 and in engagement with the feed screw 33 to facilitate traversal of the cross slide vise 66 on middle way 26 and top way 27, as hereinafter described. The cross slide vise 66 is characterized by a top way slide 67, which is slidably mounted on the top way 27 and includes a wedge lock 69 for adjusting of drag or locking on the top way 27 and a second wedge lock 69 for adjusting of drag or locking on the cross slide ways 72. A slide connector 80 is attached to the top way slide 67 by means of a tongue and groove joints 102 and roll pins 94 and incorporates a half nut 77, which engages the feed screw 33 to facilitate lateral movement of the cross slide vise 66 on the middle way 26 and the top way 27. A half nut engaging knob 76, provided with a spacer 98, a spring 79 and a cooperating locking bolt 97, serves to selectively tighten and loosen the half nut 77 against the feed screw 33. Roll pins 94 serve to pivotally secure the extended ends of the half nut 77 to the slide connector 80. A middle way slide 68 is attached to the slide connector 80 by means of tongue and groove joints 102 and roll pins 94 and slidably engages the middle way 26. A wedge lock 69, in cooperation with a wedge nut 89, serves to selectively loosen and tighten the middle way slide 68 on the middle way 26. The middle way slide 68 is supplied with an internal thread which engages the cross slide screw 73. Referring specifically to FIG. 19 of the drawings a pair of cross slide ways 72 are disposed in essentially perpendicular relationship with respect to the middle way 26 and the top way 27 and are slidably carried in the top way slide 67 at one end. The cross slide ways 72 are fixedly mounted in the backing plate 96 and slidably mounted in cross slide vise jaw 71, middle way slide 68, sliding vise jaw 70 and the top way slide 67. Referring specifically to FIGS. 16 and 21 a vise screw 74 is rotatably mounted in the backing plate 96 by means of a screw collar 84 and a roll pin 94 and the cross slide screw 73 is slidably mounted in the cross slide vise jaw 71, and is threadably mounted in the middle way slide 68 and slidably mounted in the sliding vise jaw 70. Accordingly, it will be appreciated that the cross slide vise jaw 71 can be adjusted with respect to the backing plate 96 by means of the vise screw 74. The cross slide vise jaw feature of the cross slide vise 66 can be used by placing an object between the cross slide vise jaws 71 and the sliding vise jaw 70. The sliding vise jaw 70 is then locked to the cross slide way 72 by means of a socket head screw 90 and the cooperating slot 29, illustrated in FIG. 18, and the object to be clamped is secured by adjusting the cross slide vise jaw 71. Referring again to FIG. 1 of the drawings it will be appreciated that in a preferred embodiment of the invention, jaw extensions 82, equipped with jaw extension legs 83 for registration with the mounting apertures 1 provided in the sliding vise jaw 70 and the cross slide vise jaw 71, can be used to further expand the function of the cross slide vise 66.

Referring again to FIGS. 1 and 2 of the drawings in yet another preferred embodiment of the invention a table extension 63, provided with extension legs 64 for registration with the mounting apertures 31, provided in the radial tail stock 28, is used to provide a work surface at one end of the radial universal tool 1. Similarly, a tilt table 53, provided with tilt table legs 54, which can also be placed in registration with the mounting apertures 31 in the sliding vise jaw 70 and the cross slide vise jaw 71 and is useful to provide a table saw function. In another preferred embodiment of the invention the tilt table legs 54 extend from adjusting flanges 55, with an adjusting knob 56 for adjusting the angular tilt of the tilt table 53. A miter guage 57 and rip fence 58 are also provided in cooperation with the tilt table 53 and a saw table slot 59 facilitates projection of a portion of the saw blade 60 through the tilt table 53, to facilitate the cutting function, as hereinafter described. When the tilt table 53 is in functional position as illustrated in FIG. 1, the table extension 63 can be likewise positioned in cooperation with the mounting apertures 31 in radial tail stock 28 to provide an additional work surface for operation of the tilt table 53.

In operation, and referring again to FIGS. 1 and 16-21 of the drawings, when it is desired to operate the radial universal tool 1 as a table saw, the crank 81 is placed in engagement with the lower one of the screw drives 19 provided in the cross slide vise 66. The cross slide vise jaw 71 is then adjusted by manipulation of the cross slide screw 73 to the proper spacing in order to effect registration of the tilt table legs 54 with opposing mounting apertures 31, provided in the sliding vise jaw 70 and at a cross slide vise jaw 71. The tilt table 53 is then mounted on the cross slide vise 66 and the cross slide vise 66 adjusted to an appropriate position on the middle way 26 and top way 27, by means of the screw drive 19, which cooperates with the feed screw 33. An arbor 61 is then mounted on the spindle 37 projecting from the radial head stock 34 by means of the spindle flat 52 and the saw blade 60 is mounted on the arbor 61 in conventional fashion. The half nut engaging knob 76, which effects engagement of the cross-slide vise 66 with the feed screw 33, is loosened to prevent the cross-slide vise 66 from traversing the bottom way 25 and the top way 27 and one of the screw drives 19 which cooperates with the feed screw 33 is then activated by means of the crank 81 to move the radial head stock 34 toward the cross slide vise 66. The radial screw handle 42, cooperating with the radial screw 40, is then operated to raise or lower the spindle 37 to facilitate manipulation of the saw blade 60 between the adjusting flanges 55 and upwardly through the saw table slot 59. The table saw is now ready for functional use and can be activated by manipulation of the on/off key 65 and operation of the variable speed switch 101, to control the speed of rotation of the saw blade 60.

It will be appreciated by a consideration of the design of the radial universal tool 1 as a table saw that substantially the same operational mode can be used to provide a buffing or sanding wheel. For example, the sanding disc 85, illustrated in FIG. 1 of the drawing can be mounted to the spindle 37 in the same manner as the saw blade 60 and used to effect the desired buffing or sanding operation. Furthermore, the buffing and sanding disc can be provided in cooperation with the sanding disc 85 in both horizontal and vertical orientation, as hereinafter described.

When it is desired to use the radial universal tool 1 as a wood or metal lathe, the radial head stock 34 is adjusted on the middle way 26 and top way 27 with respect to the radial tail stock 28 by manipulation of the screw drive 19 and rotation of the feed screw 33, as hereinafter described. When a correct bed length for the particular work stock chosen is effected by adjustment of the radial head stock 34, the radial screw handle 42 is rotated to tilt the radial head stock 34 with respect to the radial screw mount 43 to a desired degree in order to accommodate a work stock of given dimensions. A drive center 86 can then be mounted to the spindle 37, as heretofore described with regard to the mounting of the arbour 61 to the spindle 37. The radial tail stock 28 can then be pivoted upwardly on the top way 27 as illustrated in FIG. 10 and a cup center 88, fitted inside an adapter sleeve 87, provided in cooperation with the center mount 30 in the radial tail stock 28, to receive the opposite end of the work stock. The radial tail stock 28 can be locked into the desired angular position on the top way 27 by manipulation of the socket head screw 90 which is positioned in registration with the slot 29 at the opposite end of the radial tail stock 28 from the center mount 30. The work stock can then be seated and centered between the drive center 86, mounted on the spindle 37 and the cup center 88, rotatably positioned in the center mount 30 located in the radial tail stock 28, by further adjustment of the radial head stock 34. As heretofore described, rotation of the feed screw 33 responsive to operation of the crank 81 in engagement with the screw drive 19 effects adjustment of the radial head stock 34. When the work stock is secured between the radial head stock 34 and the radial tail stock 28, the switch 100 is activated with the on/off key 65 and the rotating work stock can be shaped accordingly.

When the radial universal tool 1 is to be used as a drill press, it can be adjusted to the configuration illustrated in FIG. 2. This adjustment is achieved by initially raising the non-pivoting end frame 22 and the bottom way 25, middle way 26 and top way 27 upwardly, as the pivoting end frame 20 pivots on the pivot shaft 23 to the upright position illustrated in FIG. 2. When the radial universal tool 1 is in this vertical orientation, the tilt table 53 can be mounted to the cross slide vise 66, as heretofore described and the cross slide vise 66 adjusted to place the tilt table 53 at a comfortable height on the middle way 26 and top way 27. When in this position, the tilt table 53 serves as a support for the work stock to be drilled. Referring again to FIGS. 11-15, the half nut engaging knob 76 mounted in the slide connector 80 is loosened to allow the radial head stock 34 to freely move on the middle way 26, top way 27 and the feed screw 33, responsive to downward manipulation of the traverse handle 47, carried by the handle block 48. Since the handle block 48 is tightly secured to the bottom way 25, manipulation of the traverse handle 47 downwardly causes the entire radial head stock 34 to also travel downwardly. Accordingly, when a chuck 62 is mounted to the spindle 37 as heretofore described and a bit (not illustrated) is placed in the chuck 62, a work stock which is resting on the tilt table 53 can be drilled by downward manipulation of the traverse handle 47. It will be appreciated that the radial head stock 34 will automatically return to its upward position by operation of the handle block spring 50 when pressure is removed from the traverse handle 47, after each respective drilling operation. Additionally, as heretofore described, adjustment of the radial head stock 34 to any desired position on the middle way 26 and the top way 27 can be achieved by tightening the half nut engaging knob 76 to fully engage the slide connector 80 and the feed screw 33. If the radial univeral tool 1 is to be used as a horizontal boring machine, the chuck 62 can be used to seat a bit as desired above and the radial universal tool 1 can be operated in the horizontal position, as illustrated in FIGS. 1 and 3.

The radial universal tool 1 can be used to perform milling machine functions by initially inserting an end mill 104, illustrated in FIG. 1, into the end mill holder 41, provided in the spindle 37, and seating the end mill 104 by means of a set screw 39. A work stock can then be either clamped in the cross slide vise 66 or otherwise secured to the cross slide vise 66 by using the T-slot 92 and V-notch 93, and appropriate clamps (not illustrated) in the cross slide vise 66. The work stock can then be milled as desired, by pivotal operation of the head stock 34 on the top way 27, traversal of the radial head stock 34 and the cross slide vise 66 on the top way 27 and middle way 26, and cross travel of the work stock in the cross slide vise 66 by operation of the cross slide screw 73.

It will be appreciated by those skilled in the art that the radial universal tool of this invention is convenient, portable and compact and is capable of performing many tool functions in a single unit. Furthermore, while the preferred embodiments of the invention have been described above, it will be recognized and understood that various modifications may be made therein and the appended claims are intended to cover all such modifications which may fall withing the spirit and scope of the invention.

Having described my invention with the particularity set forth above, what is claimed is:

1. A radial universal tool comprising:
    (a) a frame;
    (b) a pivoting end member pivotally attached to one end of said frame;
    (c) a fixed end member releasably carried by the opposite end of said frame in spaced relationship with respect to said pivoting end member;
    (d) a top way fixedly disposed in said pivoting end member and said fixed end member; a middle way fixedly disposed in said pivoting end member and said fixed end member in spaced, parallel relationship with respect to said top way; and a bottom way fixedly disposed in said pivoting end member and said fixed end member in-spaced, parallel relationship with respect to said top way and said middle way, said top way, said middle way and said bottom way disposed in different planes;
    (e) radial tail stock means pivotally carried by said top way and disposed in pivotal cooperation with said pivoting end member;
    (f) feed screw means journalled for rotation in said pivoting end member and said fixed end member and disposed in generally parallel relationship with respect to said top way, said middle way and said bottom way; and
    (g) radial head stock means slidably carried by said top way and in threadible cooperation with said feed screw means and a spindle journalled for rotation and driven in said radial head stock means, whereby said radial head stock means is adjusted on said top way with respect to said radial tail stock means, responsive to rotation of said feed screw means.

2. The radial universal tool of claim 1 further comprising a radial screw mount slidably mounted on said middle way and disposed in cooperation with said radial head stock means and a radial screw in threadable cooperation with said radial screw mount and said radial head stock means, whereby said radial screw raises and lowers said radial head stock means with respect to said middle way, responsive to manipulation of said radial screw.

3. The radial universal tool of claim 1 further comprising cross slide vise means slidably carried by said top way and said middle way, and in threadible cooperation with said feed screw means, whereby said cross slide vise means is caused to traverse said top way and said middle way responsive to rotation of said feed screw means.

4. The radial universal tool of claim 1 further comprising:
    (a) a radial screw mount slidably mounted on said middle way and disposed in cooperation with said radial head stock means and a radial screw in threadible cooperation with said radial screw mount and said radial head stock means, whereby said radial screw raises and lowers said radial head stock means with respect to said middle way, responsive to manipulation of said radial screw; and
    (b) cross slide vise means slidably carried by said top way, and said middle way and in threadible cooperation with said feed screw means, whereby cross slide vise means is caused to traverse said top way and said middle way responsive to manipulation of said feed screw means.

5. The radial universal tool of claim 3 further comprising tilt table means removably carried by said cross slide vise means and a slot provided in said tilt table means, whereby a saw blade cooperating with said spindle in said radial head stock means and positioned in registration with said slot allows said tilt table means to function as a table saw.

6. The radial universal tool of claim 1 further comprising:
(a) a radial screw mount slidably mounted on said middle way and disposed in cooperation with said radial head stock means and a radial screw in threadible cooperation with said radial screw mount and said radial head stock means, whereby said radial screw raises and lowers said radial head stock means with respect to said middle way, responsive to manipulation of said radial screw;
(b) cross slide vise means slidably carried by said top way and said middle way and in threadible cooperation with said feed screw means, whereby said cross slide vise means is caused traverse said top way and said middle way responsive to rotation of said feed screw means; and
(c) tilt table means removably carried by said cross slide vise means and a slot provided in said tilt table means, whereby a saw blade cooperating with said spindle in said radial head stock means and positioned in registration with said slot allows said tilt table means to function as a table saw.

7. The radial universal tool of claim 1 further comprising table extension means removably carried by said radial tail stock means.

8. The radial universal tool of claim 1 further comprising:
(a) a radial screw mount slidably mounted on said middle way and disposed in cooperation with said radial head stock means and a radial screw in threadible cooperation with said radial screw mount and said radial head stock means, whereby said radial screw raises and lowers said radial head stock means with respect to said middle way responsive to manipulation of said radial screw;
(b) cross slide vise means slidably carried by said top way and said middle way and in threadible cooperation with said feed screw means, whereby said cross slide vise means is caused to traverse said top way and said middle way responsive to rotation of said feed screw means;
(c) tilt table means removably carried by said cross slide vise means and a slot provided in said tilt table means, whereby a saw blade cooperating with said spindle in said radial head stock means and positioned in registration with said slot allows said tilt table means to function as a table saw; and
(d) table extension means removably carried by said radial tail stock means.

9. The radial universal tool of claim 8 further comprising wheels carried by said one end of said frame.

10. A radial universal tool comprising:
(a) a frame characterized by a pair of generally horizontally disposed supports joined at each end by cross supports and vertical struts supporting said supports at each end of said frame;
(b) a pivoting end member pivotally attached to one end of said supports and normally oriented in substantially vertical relationship with respect to said supports;
(c) a fixed end member releasably attached to the opposite end of said supports in spaced relationship with respect to said pivoting end member and normally oriented in substantially vertical relationship with respect to said supports;
(d) a top way fixedly disposed in said pivoting end member and said fixed end member in substantially parallel relationship with respect to said supports and aligned in a first horizontal plane; a middle way fixedly disposed in said pivoting end member and said fixed end member in substantially parallel relationship with respect to said supports and said top way and aligned in a second horizontal plane; and a bottom way fixedly disposed in said pivoting end member and said fixed end member in substantially parallel relationship with respect to said supports and said top and said middle way and aligned in a third horizontal plane;
(e) feed screw means journalled for rotation in said pivoting end member and said fixed end member and screw drive means attached to each end of said feed screw means for manipulating said feed screw means;
(f) radial tail stock means pivotally carried by said top way and disposed in pivotal cooperation with respect to said pivoting end member; and
(g) radial head stock means slidably carried by said top way, said middle way and said bottom way and in threadible cooperation with said feed screw means and a spindle rotatably mounted in said radial head stock means, whereby said radial head stock means can be slidably adjusted on said top way, said middle way and said bottom way, responsive to manipulation of said screw drive means on said feed screw means.

11. The radial universal tool of claim 10 further comprising cross slide vise means slidably carried by said top way and said middle way, and in threadible cooperation with said feed screw means, whereby said cross slide vise means is caused to traverse said top way and said middle way responsive to rotation of said feed screw means.

12. The radial universal tool of claim 10 further comprising tilt table means removably carried by said cross slide vise means and a slot provided in said tilt table means, whereby a saw blade cooperating with said spindle in said radial head stock means and positioned in registration with said slot allows said tilt table means to function as a table saw.

13. The radial universal tool of claim 10 further comprising:
(a) cross-slide vise means slidably carried by said top way and said middle way, and in threadible cooperation with said feed screw means, whereby said cross slide vise means is caused to traverse said top way and said middle way responsive to rotation of said feed screw means; and
(b) tilt table means removably carried by said cross slide vise means and a slot provided in said tilt table means, whereby a saw blade cooperating with said spindle in said radial head stock means and positioned in registration with said slot allows said tilt table means to function as a table saw.

14. The radial universal tool of claim 13 further comprising wheels attached in rotatable relationship to at least two of said vertical struts, whereby said radial universal tool can be wheeled into various positions.

15. A radial universal tool which is capable of performing the functions of a drill press, a horizontal boring machine, a milling machine, a table saw, a wood and metal lathe and a buffing and sanding apparatus comprising:

(a) a frame characterized by a pair of generally horizontally oriented and parallel supports; a cross-member spacing said supports at each end of said supports; a pair of support legs extending from each end of said supports in spaced relationship to a supporting surface; and slide means slidably carried by said supports and cooperating with one pair of said support legs, whereby said one pair of support legs can be folded beneath said supports;

(b) a pivoting end member pivotally attached to one end of said supports and normally oriented in substantially vertical relationship with respect to said supports;

(c) a fixed end member releasably attached to the opposite end of said supports in spaced relationship with respect to said pivoting end member and normally oriented in substantially vertical relationship with respect to said supports;

(d) a top way fixedly disposed in said pivoting end member and said fixed end member in substantially parallel relationship with respect to said supports and aligned in a first horizontal plane; a middle way fixedly disposed in said pivoting end member and said fixed end member in substantially parallel relationship with respect to said supports and said top way and aligned in a second horizontal plane; and a bottom way fixedly disposed in said pivoting end member and said fixed end member in substantially parallel relationship with respect to said supports and said top and said middle way and aligned in a third horizontal plane;

(e) feed screw means journalled for rotation in said pivoting end member and said fixed end member and screw drive means attached to each end of said feed screw means for manipulating said feed screw means;

(f) radial tail stock means pivotally carried by said top way and normally resting on the top of said pivoting end frame and at least one center mount aperture means in said radial tail stock means for receiving a work piece engaging tool; and (g) radial head stock means slidably carried by said top way, said middle way and said bottom way and in threadible and releasable cooperation with said feed screw means and a spindle rotatably mounted in said radial head stock means, whereby said radial head stock means can be selectively slidably adjusted on said top way, said middle way and said bottom way, responsive to manipulation of said screw drive means on said feed screw means and independently of said feed screw means.

16. The radial universal tool of claim 15 further comprising a radial screw mount in slidable cooperation with said middle way and a radial screw threadibly inserted in said radial screw mount and extending into cooperation with said radial head stock means, for rotationally adjusting said radial head stock means on said top way.

17. The radial universal tool of claim 15 further comprising cross slide vise means slidably carried by said top way and said middle way and in threadible and releasable cooperation with said feed screw means, whereby said cross slide vise means is caused to selectively traverse said top way and said middle way responsive to rotation of said feed screw means and independently of said feed screw means.

18. The radial universal tool of claim 15 further comprising:
(a) a radial screw mount in slidable cooperation with said middle way and a radial screw threadibly inserted in said radial screw mount and extending into cooperation with said radial head stock means, for rotationally adjusting said radial head stock means on said top way; and
(b) cross slide vise means slidably carried by said top way and cross slide vise means slidably carried by said top way and said middle way and in threadible and releasably cooperation with said feed screw means, whereby said cross slide vise means is caused to selectively traverse said top way and said middle way responsive to rotation of said feed screw means and independently of said feed screw means.

19. The radial universal tool of claim 15 further comprising tilt table means removably carried by said cross slide vise means and a slot provided in said tilt table means, whereby a saw blade cooperating with said spindle in said radial head stock means and positioned in registration with said slot allows said tilt table means to function as a table saw.

20. The radial universal tool of claim 15 further comprising:
(a) a radial screw mount in slidable cooperation with said middle way and a radial screw threadibly inserted in said radial screw mount and extending into cooperation with said radial head screw mount and extending into cooperation with said radial head stock means, for rotationally adjusting said radial head stock means on said top way;
(b) cross slide vise means slidably carried by said top way and said middle way and in threadible and releasable cooperation with said feed screw means, whereby said cross slide vise means is caused to selectively traverse said top way and said middle way responsive to rotation of said feed screw means and independently of said feed screw means; and
(c) tilt table means removably carried by said cross slide vise means and a slot provided in said tilt table means, whereby a saw blade cooperating with said spindle in said radial head stock means and positioned in registration with said slot allows said tilt table means to function as a table saw.

* * * * *